United States Patent [19]

Loce et al.

[11] Patent Number: 4,989,019
[45] Date of Patent: Jan. 29, 1991

[54] MULTI-BEAM SCANNING SYSTEM COMPENSATED FOR BANDING

[75] Inventors: Robert P. Loce, Rochester; William L. Lama, Webster, both of N.Y.; Per S. Nylen, Sollentuna, Sweden

[73] Assignee: Xerox Corporation, Stamford, Conn.

[21] Appl. No.: 469,987

[22] Filed: Jan. 25, 1990

[51] Int. Cl.⁵ .............................................. H04N 1/21
[52] U.S. Cl. ................................... 346/108; 346/160; 358/296
[58] Field of Search ................. 346/108, 107 R, 76 L, 346/160; 358/296, 300, 302; 355/202

[56] References Cited

U.S. PATENT DOCUMENTS

| | | | |
|---|---|---|---|
| 4,547,038 | 10/1985 | Mori | 350/6.5 |
| 4,566,043 | 1/1986 | Tamura | 346/108 |
| 4,637,679 | 1/1987 | Funato | 350/6.5 |
| 4,788,560 | 11/1988 | Miura | 346/108 |
| 4,796,964 | 1/1989 | Connell et al. | 350/6.8 |
| 4,797,694 | 1/1989 | Agostinelli et al. | 346/160 |
| 4,801,950 | 1/1989 | Frehling | 346/108 |

FOREIGN PATENT DOCUMENTS 2069176 8/1981 United Kingdom .

OTHER PUBLICATIONS

Applied Optics, Jul. 1987, vol. 26, No. 13, by A. Arimoto et al., entitled, "Dual Beam Laser Diode Scanning Systems".

Primary Examiner—Mark J. Reinhart

[57] ABSTRACT

A multi-beam laser ROS print system is described which is adapted to minimize banding in output prints. Multiple beams from a laser source are separated by a distance which causes the beam to scan consecutive lines in a non-consecutive scan; e.g., according to a particular beam interlacing sequence. It has been found that as a general proposition, banding decreases with increasing interlacing orders and, furhter, that once a print system error frequency, or another frequency of interest has been identified, there are a number of interlacing orders, each an optimum value, which can be introduced to reduce banding which would ordinarily result from the particular frequency error.

3 Claims, 5 Drawing Sheets

MULTI-BEAM SCANNING SYSTEM COMPENSATED FOR BANDING

BACKGROUND AND MATERIAL DISCLOSURE STATEMENT

This invention relates to a laser printing system utilizing a high speed multi-beam raster output scanner (ROS) and, more particularly, to the interlacing of consecutive modulated beams from a solid state multi-emitter laser source to reduce the effects of periodic (banding) errors caused within the ROS optical/mechanical system and the photoreceptor drive system.

It is known in the scanning art to utilize a multiple laser beam source for scanning a plurality of lines on a recording medium surface simultaneously with a plurality of laser beam outputs. This technique is finding increasing usage because it substantially increases the effective printing speed of a system compared to the conventional laser ROS printer using a single output laser source. U.S. Pat. No. 4,637,679 discloses a multi-beam scanning system utilizing two semi-conductor laser sources LD1, LD2, which are arranged as shown in FIG. 2. Their output beams are formed into parallel light flux which are polarized perpendicularly to each other. Each beam is independently modulated by signals of the scanning line of an odd number and an even number ,respectively, and it then becomes possible to write information as multiple scanning lines. A similar system is disclosed in an article in APplied Optics, July 1987, Vol. 26, No. 13, by A Arimoto, et al., entitled "Dual Beam Laser diode Scanning Systems". Further advances in the art have led to the laser emitter sources being formed within the same semi-conductor chip. Examples of this type of scan system are found in U.S. Pat. Nos. 4,788,560, 4,796,964, and 4,547,038. In U.S. Pat. No. 4,788,560 there is disclosed a scanning system wherein the scanning beam outputs are generated by a plurality of laser sources. The invention described therein is directed to a time sharing method for controlling the light amounts of the respective beams. U.S. Pat. No. 4,796,964 discloses a monolithic two beam laser emitter shown in FIG. 1. The beams from the two emitters are collimated and then directed by a rotating polygon mirror assembly to form multiple scan lines on a photosensitive drum. The invention therein is directed to an operational sequence intended to solve the problem of optical interference between the emitter outputs by controlling the ON-OFF state of each emitter. U.S. Pat. No. 4,547,038 also discloses a multi-emitter semiconductor laser unit. The invention claimed therein is directed towards the optical system required to collimate and spatially separate the light beam outputs.

A specific problem in the multi-beam type of printing system, not addressed in the above-discussed patents, is that of banding in the output print. Banding is the appearance of horizontal or vertical stripes of lighter or darker density which usually traverse the full width or length of the image being formed in the photosensitive image plane. It is a problem particularly with scanning exposure sources which involve repeatedly traversing an information carrying, intensity modulated, beam of actinic radiation over the surface of the photsensitive medium. This type of system includes those which are contemplated by the present invention. Of particular interest for purposes of the proposed invention is the horizontal banding component. Horizontal bands, that is, bands extending transversely to the direction which the imaging medium moves, are usually due to drive irregularities such as gear and axis errors or vibration of any of the optical components (mirror, lenses), or vibration of the image medium (e.g., the photoreceptor drum), or wobble in the scanning polygon mirror assembly. These vibrational phenomena cause the scan lines to have a periodic spacing error, and it is this error that results in the horizontal bands on the final print. The problem is present in light lens scanning systems and in light valve printers of the type disclosed in U.S. Pat. No. 4,797,694. However, the problem has not been considered, nor solutions obtained, to compensate for banding effects in a multi-beam type of laser scanning printer. U.K. Patent No. 2,069,176 discloses a multiple beam scanning technique which allows beams adjacent at the source to scan nonadjacent lines on the photoconductor, but does not consider the banding problem in conjunction with the scan technique.

The present invention is, therefor, directed to a multi-spot scanning printer which includes a monolithic semiconductor laser source having a plurality of emitter output points. It has been found that the banding phenomena described above is dependent upon the beam spacing and interlacing at the print medium and, more particularly, that there are specific interlacing values expressed in one embodiment as a particular cosine function, whereby banding is greatly reduced. Still more particularly, the invention is directed toward a multi beam scanning apparatus comprising a laser light source for generating a plurality of light beam outputs, optical scanning means for receiving said output beams, and directing the beams as a plurality of scanning beams to simultaneously form a plurality of raster scanned lines on the surface of a photosensitive image plane, the invention characterized by each consecutive line being formed by non-consecutive scans, the lines being interlaced by an interlacing order greater than one, horizontal banding in the output scan lines being increasingly minimized as the interlacing order increases.

DESCRIPTION OF THE INVENTION

Figure 1:
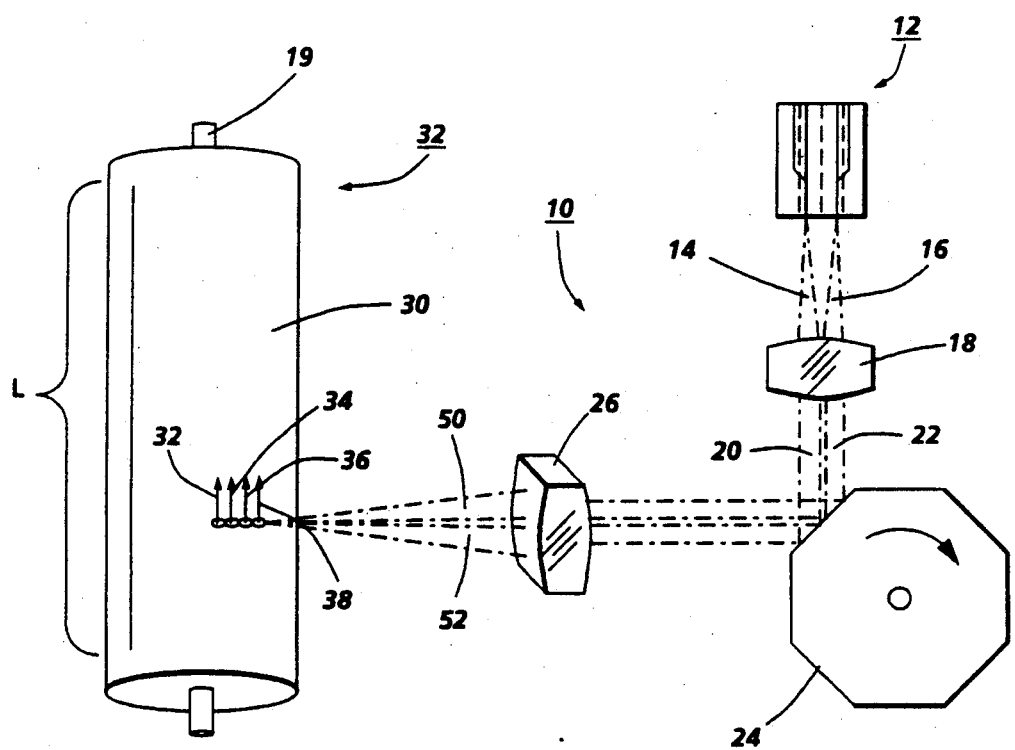
FIG. 1 is a perspective schematic view of a multi-beam ROS scanner for scanning a plurality of output beams from a multi-beam laser source onto a plurality of lines at a recording medium surface.

Referring now to FIG. 1, there is shown a dual beam ROS system 10. Array laser source 12, shown in cross-sectional view in FIG. 2, emits two output beams 14, 16. These beams are collimated by collimator lens 18 to form collimated beams 20, 22. Beams 20, 22 are then directed by a rotating polygon mirror assembly 24 to an fθ imaging and distortion correcting lens 26 which focuses the beams onto the surface 31 of photoreceptor drum 32 as scan lines 32, 34, 36, 38, etc..

Figure 2:
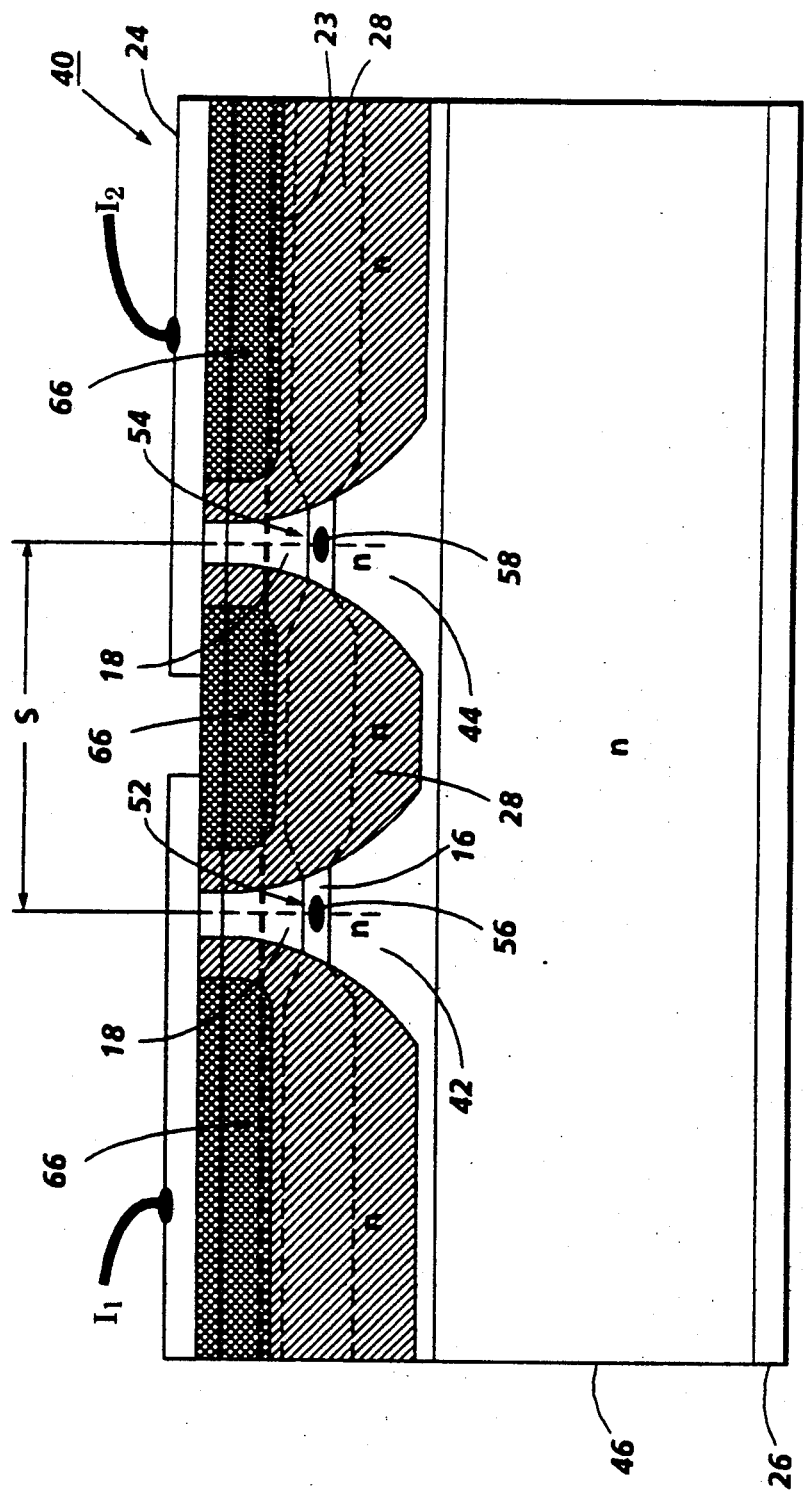
FIG. 2 is a side view of a monolithic semiconductor array laser used in the FIG. 1 system.

Laser source 12, shown in cross-sectional view in FIG. 2 is a monolithic, high density array 40 having two independently addressable emitters 42, 44. Array 40 comprises a substrate 46 of GaAs coated with a cladding layer. Each emitter 42, 44 has an active region, diodes 52, 54 which include emission points 56, 58, respectively. Cap layer 66 of p+GaAs is deposited over the inactive regions. Active regions 52, 54 are approximately 2 microns wide and emission points 56, 58 are separated by a distance 5 whose value is described in further detail below. The particular construction of the array 40 can be formed by techniques disclosed, for example, in U.S. Pat. No. 4,397,612.

Consecutive lines 32, 34, 36, 38, etc., are written at the drum 30 surface by an interlacing, rather than consecutive scan. In other words, non-adjacent scan lines (34, 38) are written simultaneously. For the system shown in FIG. 1, the number of lines the drum 30 has to advance between each scan is equal to the number of laser spots (N) which may be greater than the two shown in the embodiment. The second laser spot may be positioned at line $1+I\,N$ where $I=0, 1, 2, \ldots$ is the interlacing order, relative to the first spot. A corresponding relationship is applicable for the two diodes 52, 54 of source 12 where $D=0, 1, 2, \ldots$ is the number of the diode. The diode laser spots may hence be positioned at line $D \times (1+1N)$ relative to the line on the first spot. As the drum advances, the laser diodes will expose line number L according to $$L = D(1+I\,N) + N\,i \qquad (1)$$

where i is the scan number, $i = 0, 1, 2, \ldots$

Figure 3:
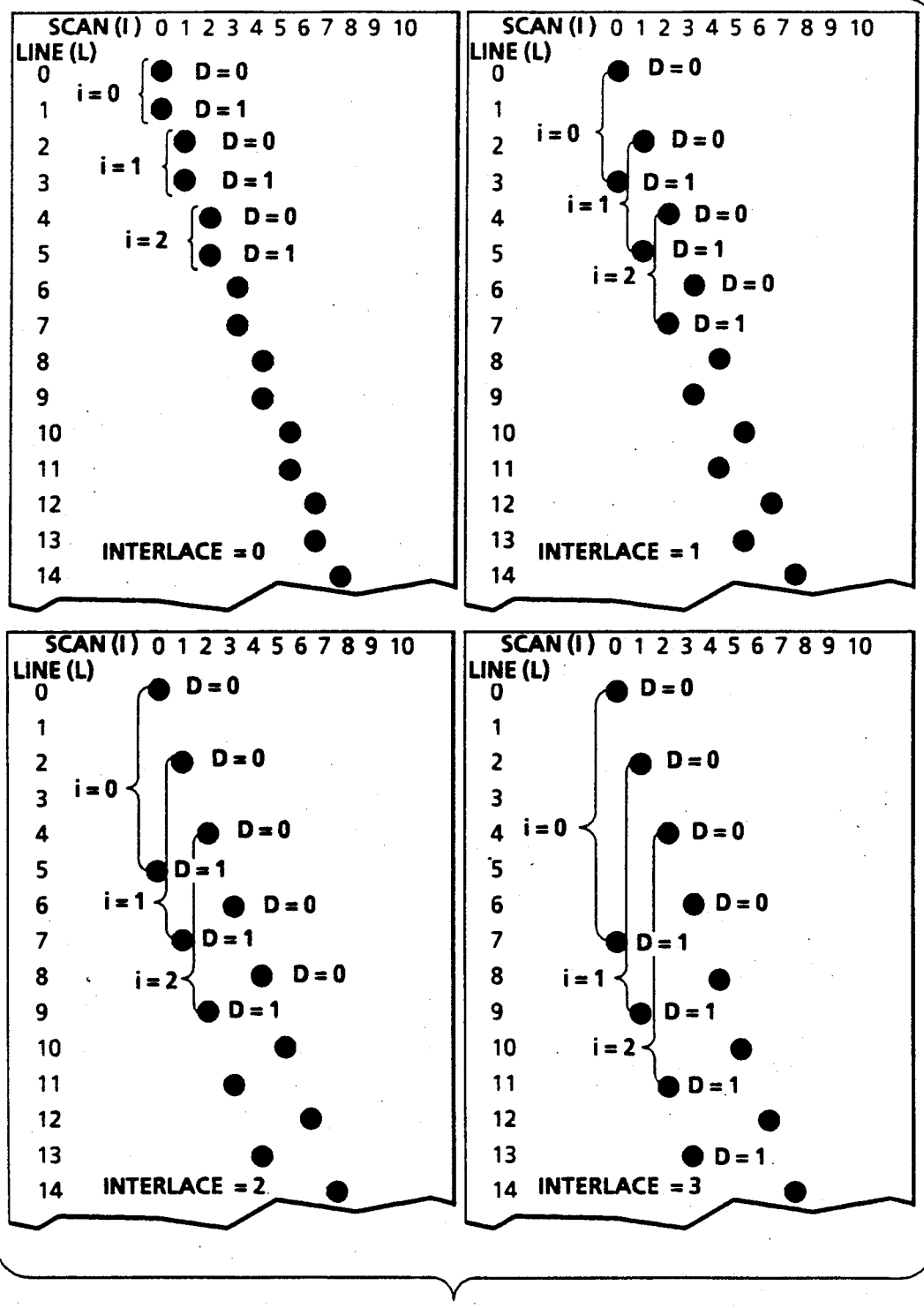
FIG. 3 shows a scan line motion for various beam interlacing orders.

From this formula follows that the different diodes will expose lines in various permutations. In order to visualize the interlacing possibilities, FIG. 3 shows the laser spots for the lines in a matrix, with the scan number as parameter. A computer simulation program was developed in order to study the influence of different kinds of errors on the creation of bandings, in particular when different interlacings are used. The program can simultaneously operate with mechanical and electrical (amplitude) errors, and is listed in Appendix A. The program first assigns the positions and amplitudes of 240 lines, taking all errors into account. The lines are written with full width half maximum (FWHM)=0.5 and a line spacing of 1.0 in order to enhance the banding. The next step is to calculate the resulting intensity distribution from these 250 Gaussian distributions (lines) at 2048 points. Each line is hence resolved by about 10 data points. In order to reduce the amount of computer calculation (about $4 \cdot 10^5$ exponentials), the calculation of the resulting intensity is made using a sweeping window that only transmits the closest lines that gives a substantial contribution. To simulate a discharged area development xerographic printing process, the intensity distribution is then digitized by making the area where the intensity is $>0.5$ into all black, and the area where the intensity is $<0.5$ into all white. In order to study the frequency distribution of the banding, a Fourier transformation of the simulated print is performed yielding the dominant frequencies of the banding. It is well known that frequencies around 1/mm are not readily seen. The human eye has a peak in sensitivity to this type of error, but frequencies above 3/mm are difficult to see.

Calculations of some simple disturbances were performed with no errors, with a constant offset between the pair of lines drawn by the two lasers, with a single frequency amplitude modulation, with a single frequency displacement error, and finally with a multiple frequency displacement error. A constant offset between the lasers, i.e., when the laser separation is not correct, a frequency of half the fundamental line frequency appears. Thus, proper alignment is important to avoid that subfrequency since it can approach the visible region. According to a first aspect of the present invention it was found that banding due to periodic errors are distributed over a larger area. Since the human eye and mind are very good at pattern recognition, periodic disturbances in the printing (banding) are easily detected. The order of interlacing (banding) should, therefore, be chosen to minimize the regularity that might cause banding in the printing. It is known that banding with a frequency about 1 cycle/mm is most noticeable to the human eye.

From FIG. 3, it is seen that when using interlacing=0, consecutive liens are exposed in the same scan. Interlace=1 explores consecutive lines in consecutive scans. Interlace=2, however, causes consecutive lines to be exposed by non-consecutive scans, actually every 2nd scan.

From the interlacing formula it follows that $$\frac{dL}{dD} = 1 + I\,N \qquad (2)$$

i.e., the spacing between lines originating from consecutive laser spots in the same scan is $$L = 1 + I\,N. \qquad (3)$$

Hence, the separation between the active laser regions in the laser structure is $$S = \left( \frac{1 + I\,N}{M_s} \right) d \qquad (4)$$

where $M_s$ is the optical magnification along S and d is the line spacing. From this laser formula it follows that, for a given optical design, the diode laser spacing increases with increased number of lasers. If, due to physical constraints, the laser spacing (S) is too large, the laser has to be tilted by an angle $$\tan^{-1}\left( \frac{n}{1 + I\,N} \right)$$

where $n = 0, 1, 2, \ldots$.

According to a second aspect of the present invention, it has been found that the banding is attenuated by the cosine of the product of the frequency of vibration and by the interlaced spacing. Optimum spacings can, therefore, be identified to suppress either known frequencies that are present in the scan system (for example, a wobble frequency in the polygon mirror assembly) or to suppress frequencies to which the eye is sensitive (e.g., 1 cycle/mm). The following represents the theoretical analysis which was conducted to arrive at the above conclusions. The analysis assumes, initially, that a dual beam ROS, is writing a solid area (all raster line "on") in the presence of single frequency photoconductor drum vibration or polygon wobble. The exposure distribution in the slow scan direction, E(x), is a sum of displaced gaussians, each with the same full width half maximum (FWHM):

$$E(x) = E_o \sum_{n=-\infty}^{\infty} \exp\{-b^2[x - 2n\Delta + k\Delta/2 - \delta_s\sin(2\pi f_x(2n\Delta) + \phi)]^2\} + \quad (5)$$

$$\exp\{-b^2[x - 2n\Delta - k\Delta/2 - \delta_s\sin(2\pi f_x(2n\Delta) + \phi)]^2\}$$

where
b = 2($\pm$ln 2)/FWHM
$\Delta$ = nominal raster spacing
K = number of raster line separations between beams
$\delta_s$ = displacement error $f_x$ = vibration spatial frequency $\Phi$ = phase of vibration at n=o Fourier transforming E(x) gives the frequency spectrum, E(f), of the exposure distribution as well as the banding dependence on the spacing parameter k. Thus, $$E(f) = [2E_o(\sqrt{\pi})/b]\exp(-\pi^2 f^2/b^2)\cos(\pi f k \Delta) \quad (6)$$

$$\sum_{n=-\infty}^{\infty} \exp\{-i2\pi f(2n\Delta) + \delta_s\sin(2\pi f_x(2n\Delta) + \phi)]\}$$

The summation can be approximated by a large component at the vibration frequency, $f=f_x$, and another at the raster frequency $f=1/\Delta$. The component at the lower vibration frequency is the cause of the undesirable bands in the print lines at the drum surface. It is significant that the beam spacing ("interlace") parameter, k, appears only in the cosine factor and can be chosen to reduce a particular frequency component.

To restate the problem addressed by the present invention, reflectance modulation (banding) in the output print can occur in halftone or solid area (background or gray) images as a result of polygon wobble or photoconductor vibration. The reflectance modulation is strongly dependent on the exposure modulation and Eq. 6 shows the dependence of solid gray exposure modulation on the interlace separation, k. With a proper choice of beam separation, exposure modulation at the perturbation frequency and the resulting reflectance modulation can be minimized. Minimum banding occurs when the "interlace" parameter k is given by:

$$k = (1 + 2 m)/(2f_x\Delta) \quad (7)$$

when m is an integer and k must be chosen to the nearest odd integer. Note that the spatial beam separation (k$\Delta$) given by the zero order solution (m=0) separates the beams by $\frac{1}{2}$ the perturbation period. Note also that according to this second aspect of the invention, there is an infinite number of solutions or interlacing values.

As an example, consider a 600 spi system with polygon wobble occurring at $f_x$=1 cy/mm. The interlace separation values, which minimize this banding are given by:

ti k=11, 13, 35, 37, 59, 61, etc.

Figure 4:
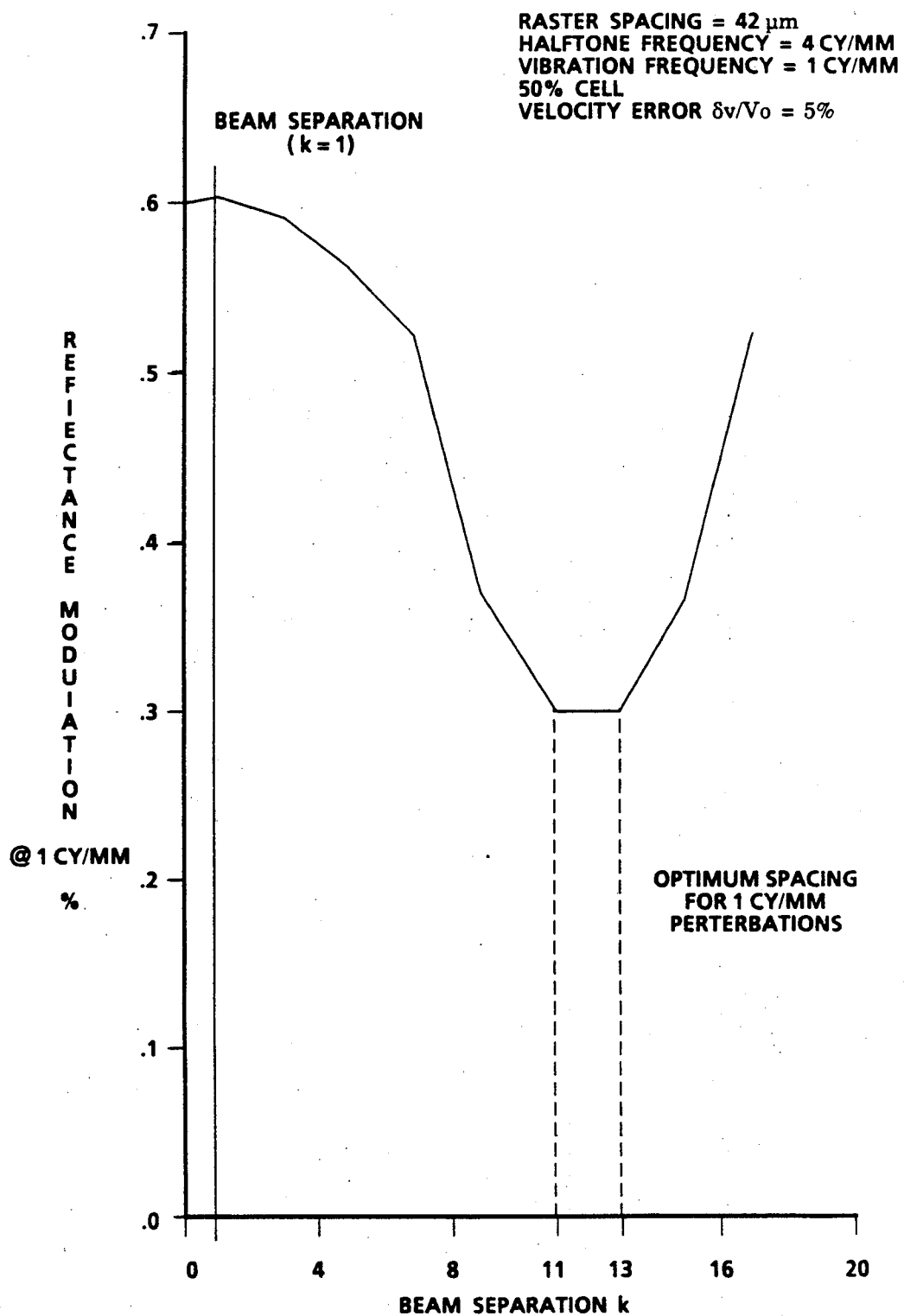
FIG. 4 is a plot of beam separation versus reflectance modulation.
Figure 5:
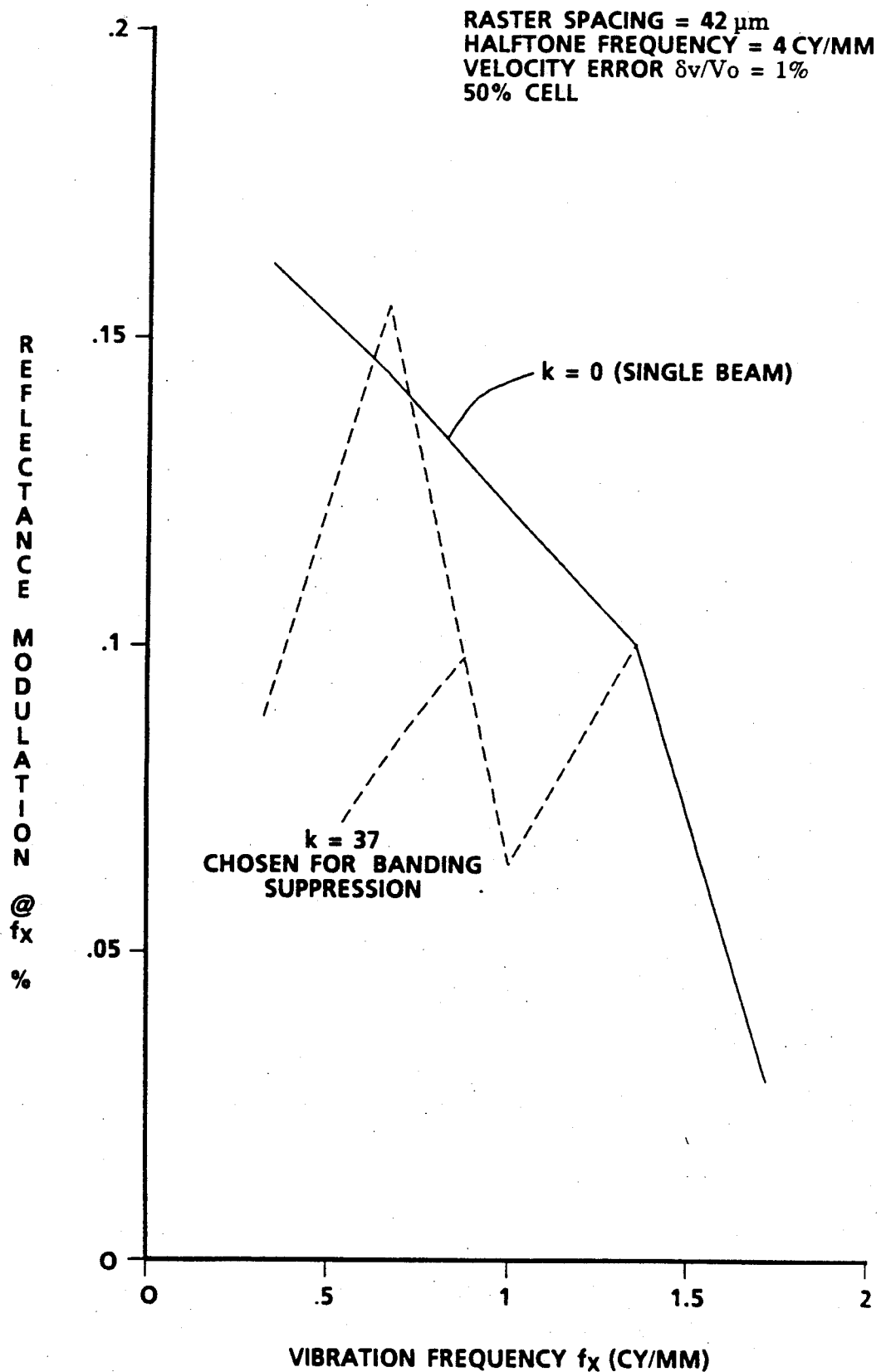
FIG. 5 is a plot of vibration frequency versus reflectance modulation at different beam separations.

Even values of k are not used since the raster lines would not interlace properly. The analysis thus far was performed for a solid area exposure because of the simplicity of the mathematics. The dependence of banding on beam separation also holds for halftone images. To show this dependence, halftone images were written with a vibration frequency of 1 cy/mm. The exposure distribution E(x) was input to a xerography model to calculate the reflectance distribution. Using Fourier analysis, the reflectance banding in the print was then calculated as a function of beam spacing. The results are plotted in FIG. 4. Note that the banding minimum occurs at the predicted beam separation and that maximum banding occurs at the adjacent separation (k=1). Also note that the banding does not go completely to zero. This is a result of non-linearities in the xerographic process. High order solutions (m>0) can result in several frequency components being damped in the range of interest. FIG. 5 shows the dependence of banding on vibration frequency for k=0 (single beam) and k=37. This large k value is the zero order solution for $f_x = \frac{1}{2}$ cy/mm and the first order solution for $f_x = 1$ cy/mm. It is seen that banding at these two frequencies is significantly reduced. When using large separations between the beams, more data needs to be stored in an active buffer at the time of printing, but banding will be suppressed at more frequencies. The concept is also applicable to systems with more than two beams, e.g., in a quad beam system.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

We claim:

1. A multi beam scanning apparatus comprising:
   a laser light source for generating a plurality of light beam outputs,
   optical scanning means for receiving said output beams and directing the beams as a plurality of scanning beams to simultaneously form a plurality of raster scanned lines on the surface of a photosensitive image plane,
   the invention characterized by each consecutive line being formed by non-consecutive scans the lines being interlaced by an interlacing order greater than one, horizontal banding in the output scan lines being increasingly minimized as the interlacing order increases.

2. The scanning apparatus of claim 1 further characterized by said raster lines being interlaced by a separation value k which minimizes horizontal banding in the output scan lines caused by a vibration at a spatial frequency $f_x$ of one or more of the components of said optical system, the value k being equal to $k=(1+2M)/2f_x\Delta$ where m is an integer and k is the nearest odd integer to the particular solution.

3. The scanning apparatus of claim 1 wherein said laser light source includes a plurality of diode emitters separated by a distance $$S = \left(\frac{1 + IN}{M_s}\right)d$$

where $M_s$ is the optical magnification, d is the raster line spacing, I is an interlacing order greater than 1 N in the number of laser spots scanned at the image plane.

* * * * *